Figure 7B:
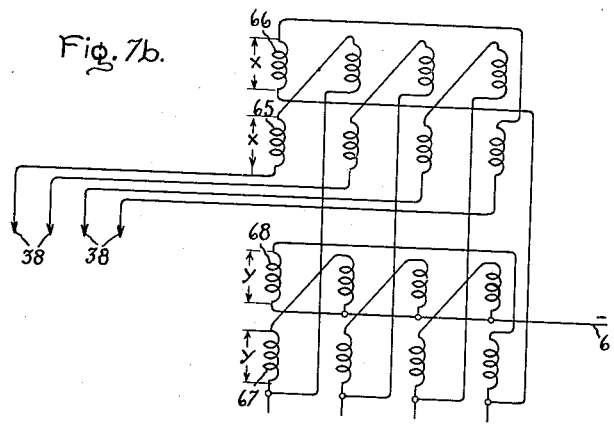

June 24, 1941.  J. W. BOAG ET AL  2,247,078
ELECTRIC VALVE TRANSLATING APPARATUS
Filed Feb. 5, 1940  4 Sheets-Sheet 1
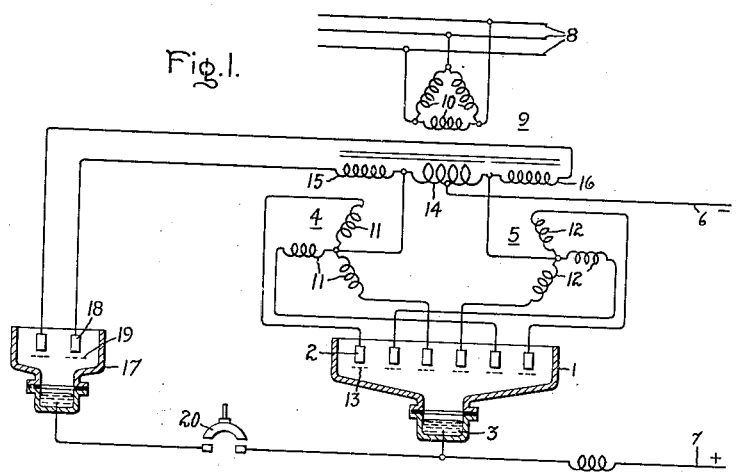
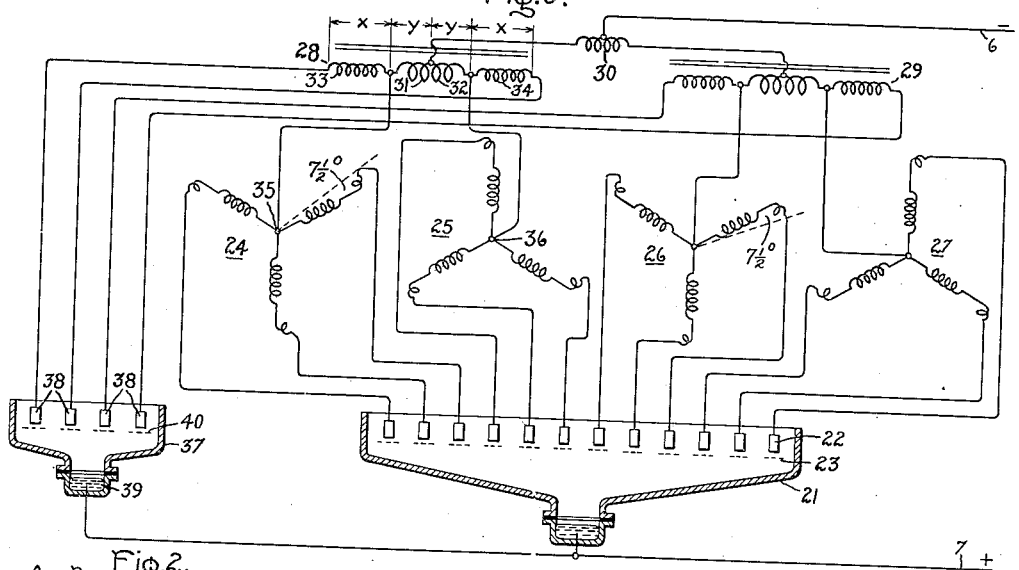
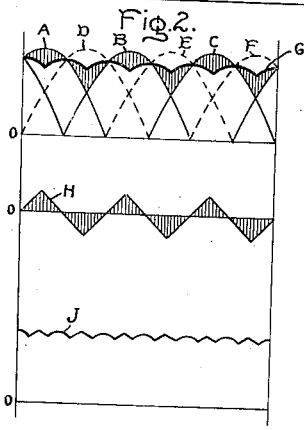
Inventors:
John W. Boag,
John C. Read,
by Harry E. Dunham
Their Attorney.

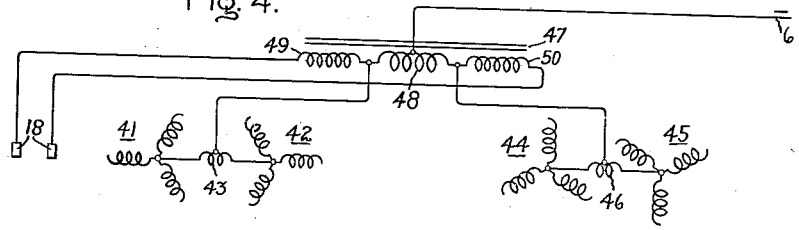
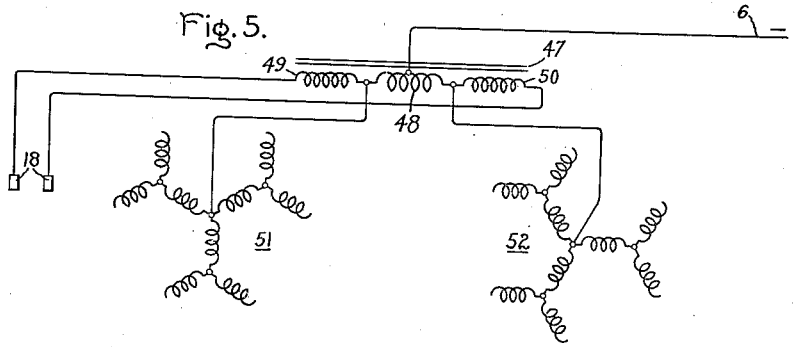
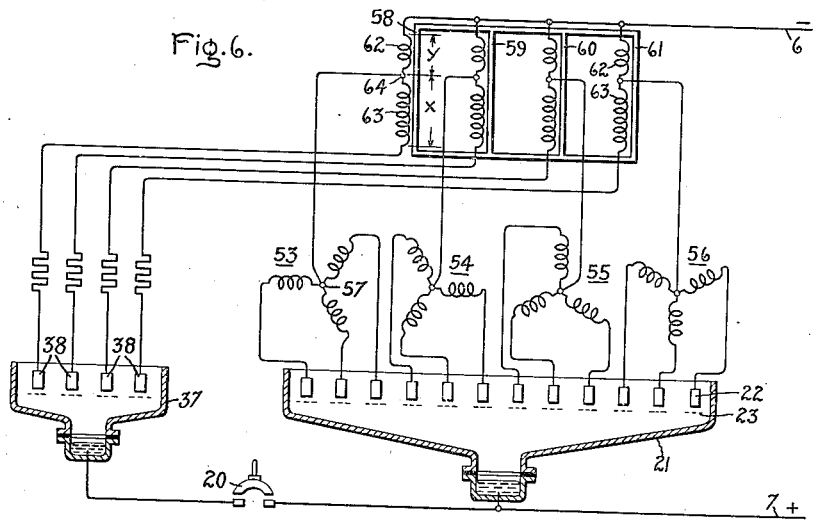
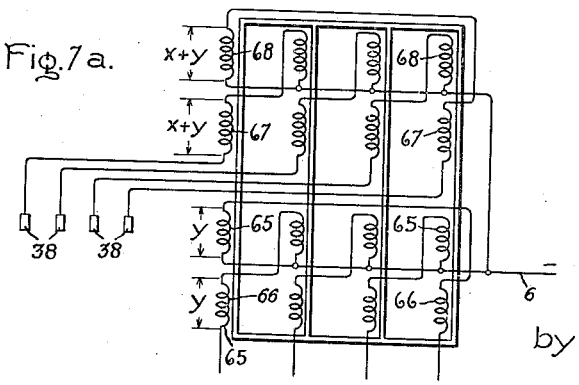

Inventors:
John W. Boag,
John C. Read,
by Harry E. Dunham
Their Attorney.

June 24, 1941.    J. W. BOAG ET AL    2,247,078
ELECTRIC VALVE TRANSLATING APPARATUS
Filed Feb. 5, 1940    4 Sheets-Sheet 4
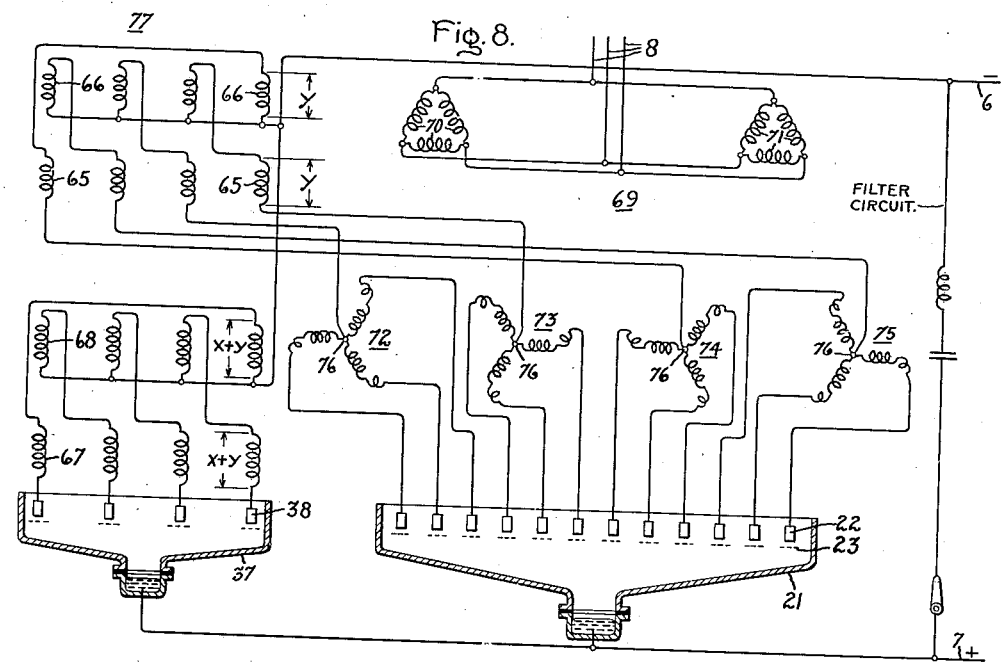
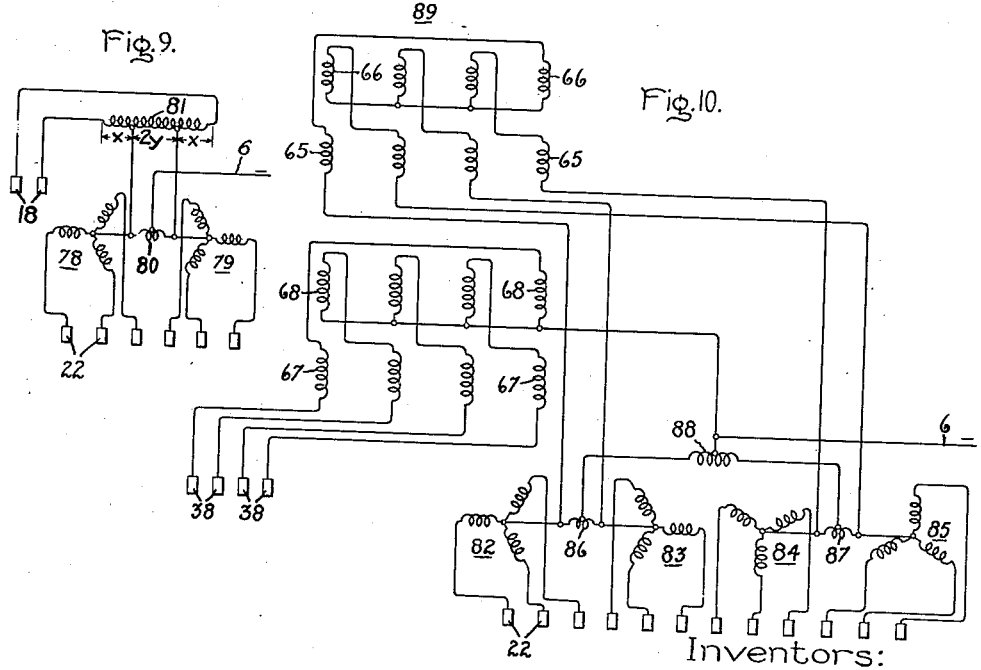
Inventors:
John W. Boag,
John C. Read,
by Harry E. Dunham
Their Attorney.

Patented June 24, 1941

2,247,078

UNITED STATES PATENT OFFICE 2,247,078

ELECTRIC VALVE TRANSLATING APPARATUS

John W. Boag and John C. Read, Rugby, England, assignors to General Electric Company, a corporation of New York Application February 5, 1940, Serial No. 317,450
In Great Britain February 9, 1939

11 Claims. (Cl. 175—363)

Our invention relates to electric valve translating apparatus and more particularly to electric valve circuits for transmitting power between alternating current circuits and direct current circuits.

In electric valve translating circuits for the transmission of power between alternating current circuits and direct current circuits, it is desirable to employ a relatively large number of electric discharge paths in order to improve the wave form of the currents supplied to the load circuit. For example, in the transmission of power from alternating current circuits to direct current circuits, it is important in many applications to employ multi-phase rectifying systems in order that the wave form of the direct current voltage is relatively smooth and devoid of abrupt changes in magnitude which would be present by using a smaller number of phases. In addition, it is desirable to use arrangements which permit the simultaneous operation of two or more of the electric discharge paths so that the utilization or utility factor of the rectifier phases is maintained at a relatively large value. Rectifier circuits have accordingly been developed which operate so that two or more anodes carry current simultaneously and during a considerably greater portion of the voltage cycle than that which occurs in the case of simple multi-phase rectifier circuits. Many of these systems function by using what is termed phase equalizing or interphase transforming means. In arrangements of this nature, successive phases or independent phase groups are electromagnetically coupled so as to produce anode voltages which are more or less trapezoidal in wave form compared to the combined sinusoidal voltages of the simultaneously operating phases. Rectifier circuits employing interphase transformers or phase equalizing means may, therefore, be characterized by the features that as many anodes carry current simultaneously as there are couplings between phases or phase groups, and that the output voltage at any instant is equal to the mean of the voltages of the simultaneously operating phases.

In accordance with the teachings of our invention described hereinafter, we provide new and improved phase equalizing or interphase transforming means whereby the wave form of the delivered voltage is substantially improved. Our invention relates to improvements in interphase transforming circuits such as that disclosed and claimed in co-pending patent application Serial No. 262,542 of Heinz Puppe. For example, our system relates to interphase transforming means whereby a rectifying system, adapted to operate as a six-phase rectifier, can be caused to yield the approximate equivalent of twelve-phase operation by connecting small additional anodes or rectifying devices to suitable additional or auxiliary windings provided on the interphase transformer. We have found that certain predetermined ratios of the number of turns of the main windings to the number of turns of the auxiliary windings of the interphase transformer afford highly desirable results in wave form.

It is an object of our invention to provide new and improved electric valve translating circuits.

It is another object of our invention to provide new and improved interphase transforming means for polyphase electric valve rectifier systems.

It is a further object of our invention to provide new and improved interphase transforming means in which the turn ratios are fixed to obtain desirable output voltage characteristics.

Briefly stated, the present invention may be described as relating to an electric valve rectifier equipment having $np$ main phases where $np$ is greater than six, and which are divided into $n$ similar groups of $p$ phases per group, and the neutral points of the $n$ groups being connected to the main neutral point by means of an $n$ phase interphase transformer. The interphase transformer has auxiliary windings provided on its $n$ phases, with a suitable turn ratio more particularly defined hereinafter, and these auxiliary windings are connected to $n$ auxiliary rectifying devices to obtain the approximate equivalent of $2np$ phase output voltage.

For a better understanding of our invention, reference may be had to the following description taken in connection with the accompanying drawings, and its scope will be pointed out in the appended claims. Fig. 1 diagrammatically illustrates generally an application of an auxiliary rectifying means and an interphase transformer having auxiliary windings for controlling the output characteristic of an electric valve rectifier, such as that broadly disclosed and claimed in the above-identified copending patent application of Heinz Puppe. Fig. 2 represents certain operating characteristics of the arrangement shown in Fig. 1. Figs. 3-11 represent certain modifications of our invention as applied to $n$-phase rectifying systems in which the interphase transforming means assumes various forms and in which the turn ratios have definite values to obtain the desired output voltage characteristics of the electric valve rectifying system. Fig. 12 illustrates a modification of the embodiment of my invention shown in Fig. 11 as applied to groups of polyphase transformers interconnected through interphase transforming means.

Referring now to Fig. 1, the broad principle underlying our invention may be explained by referring to the electric valve translating system shown in Fig. 1. A polyphase electric valve rectifier 1 having a plurality of anodes 2 and a cathode 3 is connected to two inductive networks 4 and 5 for transmitting power to the direct current circuit, including conductors 6 and 7, from the polyphase alternating current circuit 8 through a transformer 9 having primary windings 10 and secondary windings 11 and 12 which constitute the inductive networks 4 and 5. The secondary windings 11 and 12 may be arranged to form a double-star connection having the respective systems of phase windings displaced sixty electrical degrees. The electric valve means 1 may also be provided with control members or grids 13 to control the magnitude of the output voltage impressed on the direct current load circuit. An interphase transformer having a main winding 14 and auxiliary winding 15 and 16 is connected between the inductive networks 4 and 5 to increase the utilization factor of the electric valve translating system and to improve the wave form of the output voltage. The interphase transformer produces an equalizing voltage which tends to maintain an equal current distribution between the simultaneously operating phases. This equal voltage is a harmonic voltage determined by the number of phases of the groups 4 and 5; that is, in the form shown in Fig. 1 the harmonic voltage is a third harmonic. An auxiliary rectifying means 17 including a plurality of electric discharge paths is connected to the auxiliary windings 15 and 16 of the interphase transformer and serves to conduct current to the load circuit in parallel with the arc discharge paths of the main electric valve means 1. The electric valve means 17 may include a plurality of anodes 18 and associated grids 19. A suitable circuit controlling means, such as a circuit breaker 20, may be connected between the electric valve means 17 and the positive terminal of the direct current circuit to connect the auxiliary rectifier 17 and the auxiliary windings of the interphase transformer effectively in circuit if it is desired to improve the wave form of the voltage impressed on the direct current circuit. When the switch 20 is closed, the system operates to produce a direct current output having a twelve-phase ripple, whereas when the circuit breaker is open the system operates as a system having a six-phase ripple voltage.

The operation of the system shown in Fig. 1 may be more fully appreciated by referring to the operating characteristics shown in Fig. 2, where curves A, B and C represent the phase voltages of the secondary windings 11 in network 4, and curves D, E and F represent the phase voltages of the secondary windings 12 in network 5. The resultant curve G represents the output voltage of the rectifier employing the interphase transformer without use of the auxiliary windings 15 and 16. That is, curve G represents the mean phase voltage of both networks 4 and 5. Each of the secondary windings 11 and 12 conducts current for 120 electrical degrees but for only 60 electrical degrees with any one other phase winding in another group. The curve H represents the third harmonic voltage which appears across the terminals of the windings of the interphase transformer and which effects equalization of the instantaneous phase voltages to cause the windings which are displaced in phase to conduct current simultaneously. Curve J represents the output voltage obtainable when the circuit breaker 20 is closed, effectively connecting the rectifier 17 in the system. It will be noted that the ripple of the output volage represented by curve J corresponds to that of a twelve-phase system.

Referring now to Fig. 3, our invention is there illustrated as applied to an electric valve means 21 having a plurality of anodes 22 and associated grids 23. The electric valve means 21 may have twelve anodes energized from four inductive networks 24-27, inclusive, connected to form two six-phase double-star connections. It will be understood that inductive networks 24 and 25 in conjunction with interphase transformer 28 form a six-phase double-star connection, and that networks 26 and 27 and the interphase transformer 29 also form a six-phase double-star connection. A third interphase transformer 30 may be connected between the interphase transformers 28 and 29 and the negative terminal of the direct current circuit. The phase windings or the phase voltages of the two systems are displaced fifteen electrical degrees by virtue of the zigzag connections. Interphase transformer 28 is provided with a pair of oppositely disposed main winding sections 31 and 32 and a pair of auxiliary windings 33 and 34. For the purpose of representing the turn ratios of the various sections of the windings of the interphase transformers, the portions of the main windings will be represented by $y$ and the number of turns of the auxiliary windings will be represented by $x$. The neutral connections 35 and 36 of the networks 24 and 25 are connected to the junctures of the auxiliary winding sections and the main winding sections of the interphase transformers.

We provide an auxiliary rectifying means 37 comprising a plurality of auxiliary electric discharge paths including a plurality of anodes 38 and a cathode 39. The electric discharge paths may be of the controlled type having associated grids 40. The anodes 38 correspond in number to the total number of auxiliary windings of interphase transformers 28 and 29 and are connected thereto to double the frequency of the ripple frequency of the output voltage impressed on the direct current load circuit comprising conductors 6 and 7. We have found that the turn ratio $$\frac{x}{y}$$

in the interphase transformers 28 and 29 for satisfactory operation is approximately 5.46.

The rectifier system of Fig. 3 operates so that the inductive networks 24 and 25 form a six-phase system, and the auxiliary anodes connected to auxiliary windings 33 and 34 of the interphase transformer 28 in conjunction with the associated anodes 38 convert this system to an approximate equivalent of a twelve-phase system. Similarly, inductive networks 26 and 27 and the associated interphase transformer 29 and auxiliary anodes 38 in turn operate as another equivalent twelve-phase system. Since these two twelve-phase systems are displaced by fifteen electrical degrees relative to each other, the complete system is the approximate equivalent of a twenty-four-phase system. This connection is, however, for some purposes less advantageous than those which will be hereinafter described inasmuch as with the auxiliary anodes 38 disconnected, it reverts not to twelve-phase operation but to a modified form of six-phase operation.

This feature of the arrangement shown in Fig. 3 is obviated in the connections shown in Figs. 4 and 5. In Fig. 4, two six-phase double-star connections are employed, each displaced by thirty electrical degrees. In the arrangement of Fig. 4, the inductive networks 41 and 42 are interconnected through an interphase transformer 43, and the inductive networks 44 and 45 are interconnected through an interphase transformer 46. The two six-phase double-star systems are interconnected through the interphase transformer 47 having a main winding 48 comprising two oppositely disposed sections, and having auxiliary windings 49 and 50. The auxiliary windings 49 and 50 are, of course, connected to a pair of auxiliary electric discharge paths as shown in Fig. 1.

The phase displacement between the two six-phase systems in the arrangements of Figs. 3 and 4 may be obtained either by zigzag connection of the secondary windings or by providing the two six-phase systems with separate primary windings and suitably connecting the phase connections of the primary windings in accordance with transformer connections well known to those skilled in the art.

Similarly, in Fig. 5 two six-phase triple-star systems 51 and 52 are connected to operate together, the respective phase voltages thereof being displaced thirty electrical degrees from each other and are connected to the interphase transformer 47. In both Figs. 4 and 5, the interphase transformer 47 is arranged to have a turn ratio of approximately 27.3:1; that is, the ratio of the number of turns of the auxiliary windings 49 and 50 to the associated sections of the main winding 48 is 27.3. Either of these systems affords the approximate equivalent of twenty-four-phase operation and reverts to twelve-phase operation if the auxiliary anodes 18 are disconnected from the system.

The transformer connections described above are, generally speaking, specialized cases of a general system. In the general case a rectifier having $np$ main phases may be considered as having $n$ similar groups of $p$ phases per group, the phase displacement between phases in a group being $2\pi/p$. The neutral points of the $n$ groups are connected to an $n$ phase interphase transformer; and the auxiliary windings on the $n$ phases of this interphase transformer are connected to $n$ auxiliary rectifying devices.

In Fig. 6 this general case is illustrated for the arrangement where $n$ is equal to 4 and $p$ is equal to 3; that is, the secondary windings of the main transformer supplying the main anodes consists of four three-phase star-connected systems 53, 54, 55 and 56, displaced apart by thirty electrical degrees. The neutral connections 57 of the star-connected windings 53–56 are connected to windings of interphase transforming means including legs 58, 59, 60, and 61, respectively. The interphase transforming means may be considered as a four-phase interphase transformer to provide the common negative terminal of the direct current circuit comprising conductors 6 and 7. This interphase transforming means may be constructed to have a four-leg magnetic core structure such as that disclosed and claimed in United States Letters Patent No. 1,794,246, granted February 24, 1931, on an application of John C. Read. Associated with each leg of the interphase transformer we provide a main winding 62 and an auxiliary winding 63, the common juncture 64 of which is connected to the neutral connection 57 of the associated star-connected inductive network. The auxiliary windings 63 are connected to the auxiliary rectifier 37 which operates in parallel with the main rectifier 21.

The turn ratio of the interphase transforming means is made approximately equal to:

$$\frac{x}{y} = \frac{1}{\left[\dfrac{n \sin \dfrac{(n-1)\pi}{np}}{\sin \dfrac{\pi}{p}} - n + 1\right]} - 1$$

This turn ratio produces effects on the alternating current supply circuit and the direct current load circuit closely equivalent to a rectifier equipment having $2np$ phases.

In accordance with another feature of our invention shown in Figs. 7a and 7b, we provide improved interphase transforming means for interconnecting the main transformer windings, the interphase transformer and the auxiliary rectifying devices. For example, in the arrangement of Fig. 7a, the magnetic circuit of the $n$ phases, where $n$ is equal to 4, may have $n$ legs and each leg carries two main windings 65 and 66 connected in opposition and which are connected in series relation to the neutral points of the associated star inductive network, such as that shown in Fig. 6. The respective phase groups of the individual network are displaced in phase by $2\pi/np$ electrical degrees. Each leg of the interphase transforming means also includes two auxiliary windings 67 and 68 similarly connected. The auxiliary windings, of course, are connected to the auxiliary electric discharge paths. The turn ratio $$\frac{x}{y}$$

is established by the same expression as stated above in connection with the arrangement of Fig. 6 and the operating results are quite similar, that is, are approximately equivalent to a rectifier having $2np$ phases.

Fig. 7b is substantially the same as that explained above in connection with Fig. 7a and corresponding elements have been assigned like reference numerals. In the arrangement of Fig. 7b, however, the auxiliary windings 68 are connected in circuit with a main winding of a different phase of the interphase transforming means.

Fig. 8 diagrammatically illustrates an arrangement of an electric valve rectifying system in which the main anodes are supplied by a transformer 69 comprising primary windings 70 and 71 and groups of secondary windings 72–75, The groups of secondary windings 72–75 are arranged in what is commonly known as a twelve-phase quadruple zigzag with double primary windings. The four neutral points 76 of the secondary windings are connected to interphase transformer 77 which may be of the type shown in Figs. 7a and 7b having a core structure comprising four magnetic legs each leg having associated main windings 65 and 66 and auxiliary windings 67 and 68. The turn ratio is determined in accordance with the expression given above and is approximately $x:y=2.76:1$. This arrangement in operation is approximately the equivalent of twenty-four-phase system. The amount of power which the auxiliary rectifier 37 is required to transmit is a very small proportion of the total power transmitted by the system. If desired, a suitable filter circuit may be connected across the terminals of the direct current circuit to absorb undesirable voltage characteristics.

An advantage of these arrangements, such as that shown in Fig. 8, is the fact that it is possible to install a rectifier initially to operate in the usual way well known and to convert this at a later time to yield approximately the equivalent of a rectifier system having a double number of phases if subsequent conditions prove such operation to be desirable. That is, a system may be initially installed to have $np$ phases and by adding the auxiliary rectifier equipment to the interphase transformer the system may be made to operate with a $2np$ phase characteristic. Such a conversion could be effected either by initially constructing the interphase transformers with the necessary auxiliary windings or by replacing the auxiliary transformers by interphase transformers with the necessary auxiliary windings. As a further arrangement, the system could be initially built in accordance with the circuit diagram shown in Figs. 9 and 10 in which the original interphase transformers are left in use and an additional interphase transformer may be connected in parallel relation with them in the manner shown to supply the auxiliary rectifier. Thus in Fig. 9 the original six-phase double-star transformer including windings 78 and 79 and an interphase transformer 80 may be converted to an equivalent twelve-phase system by employing an additional interphase transformer 81 having main winding sections and auxiliary winding sections. The turn ratio may be established to have the following value: $x:y=5.46:1$. It is not necessary that the original interphase transformers be of the same connection as the auxiliary interphase transformers thus connected in parallel with them provided that the voltages across the transformer to neutral are of the same form and effect division of the $np$ phase rectifier into the same number of $n$ groups. Thus, in Fig. 10 a twelve-phase rectifier comprising groups of star-connected windings 82–85 and interphase transformers 86, 87 and 88 may be provided with an auxiliary interphase transformer 89 of the type described above in connection with Figs. 7a, 7b and 8. The auxiliary interphase transformer 89 supplies the auxiliary anodes 38 of the auxiliary rectifier 37 to convert the equipment to an approximate equivalent of a twenty-four-phase system. As in Fig. 8, the turn ratio of $x:y$ is approximately 2.76.

A particular advantage of the arrangement shown in Fig. 10 and also of the arrangement shown in Fig. 12, described hereinafter, is that the interphase transformer 89, on which the auxiliary windings 67 and 68 are wound, does not carry the direct current components of the main anode currents so that its core is not susceptible to direct current saturation in the event the currents become unbalanced. The most likely form of such unbalance is that due to the currents flowing in the two halves or secondary windings of the interphase transformer 88. In practice, this latter interphase transformer can be readily designed or arranged to carry such unbalanced currents without its action being impaired. The arrangement shown in Fig. 9 also has this advantage, but it is of less value in that instance since unbalance of the currents in the two halves of the main anode system is much less likely to occur in a six-phase system than in a twelve-phase system.

Any main transformer connections affording balanced $np$ phase operation can be used in conjunction with any of the $n$ phase interphase transformer arrangements described above. For example, the twelve-phase main transformer connection illustrated in Figs. 6, 10 and 12 are interchangeable with the quadruple zigzag twelve-phase connection with double primary windings illustrated in Fig. 8. Furthermore, the latter may have a single three-phase primary winding with the reactances between windings so adjusted as to give balanced operation in a twelve-phase system.

Figure 11:
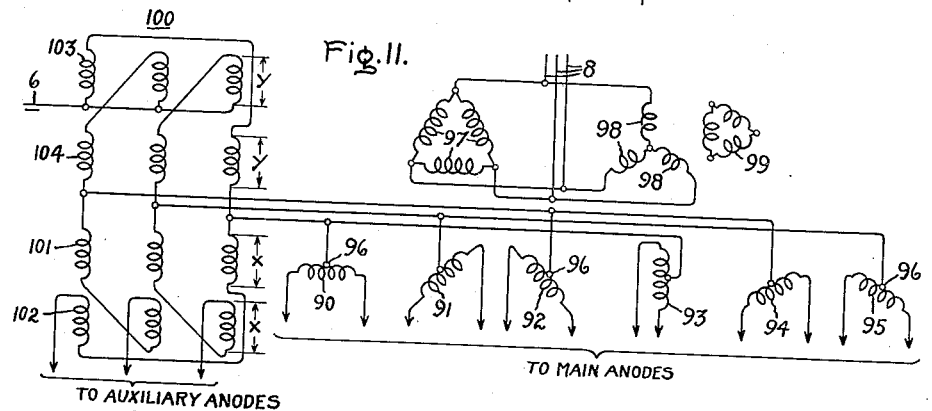
Figure 12:
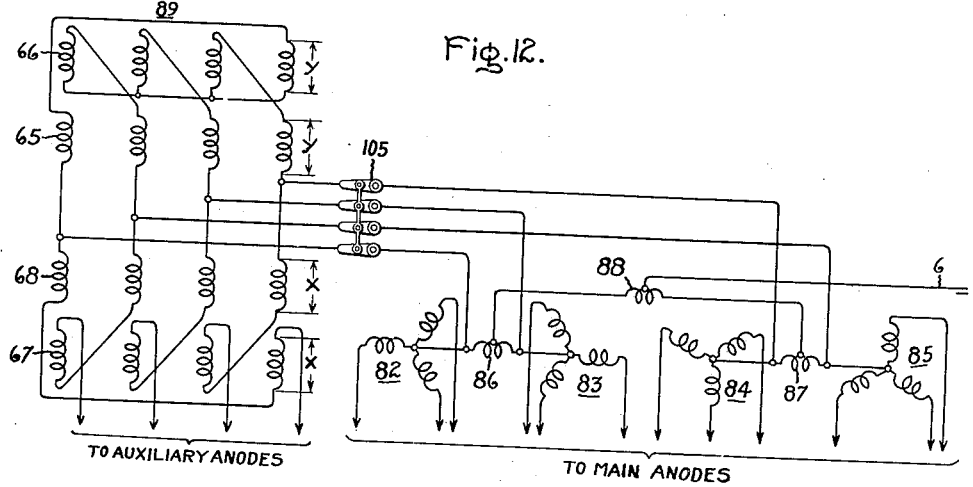

Fig. 11 shows an application of our invention to a twelve-phase connection in which $n$ is equal to three and $p$ is equal to four and having a turn ratio of $x:y=7.24:1$. As in the other connections, the 30 degree electrical phase displacement between main transformer phases could equally well be obtained by zigzag connections. In the arrangement of Fig. 11, the main anodes of the electric valve means (not shown) are energized from a plurality of single phase windings 90–95 each having a neutral connection 96, and are energized from the alternating current supply circuit 8 through primary windings 97 and 98 of the associated transformer. A closed delta tertiary winding 99 may also be employed in the manner well understood by those skilled in the art. The tertiary winding 99 is so constructed that its impedance to the flow of triple harmonic currents is made relatively small to permit the flow of third harmonic currents. The interphase transformer 100 is preferably of the type comprising a core structure having three legs each of which is provided with two auxiliary windings 101 and 102, and two main windings 103 and 104.

Of course, in all instances the auxiliary anodes may be protected by fuses or reactors. In the instance where the interphase transformer including the auxiliary windings does not carry the load current of the main anodes, such as in Figs. 9, 10, and 12, the protective equipment, which may be a fuse or a switch 105, may be connected between the main transformer system and the auxiliary transformer system.

It is to be understood that it is undesirable to destroy the symmetry of operation of the main rectifier in the event of any dissymmetry of operation of the auxiliary rectifier 37. The switch 105 may be made to operate in response to any such dissymmetry to disconnect the auxiliary interphase transformer upon the occurrence of erratic or irregular operation.

In Fig. 12 a further modification of our invention is shown. It is immaterial in the practice of our invention as to whether or not the interphase transformer is connected to the phase terminals of the main windings, as discussed above, or whether the interphase transformers are connected directly to the main neutral points. It is to be understood that wherever one or the other type of interphase transformer is shown, the other type may be used; that is, Fig. 12 shows how the connection of Fig. 10 may be modified if the interphase transformer is connected as an auto-transformer. In the arrangement of Fig. 12, the turn ratio is, of course, $x:y=2.76:1$.

In all of these connections where interphase transformers between the neutral points of the $n$ phase groups have been referred to, it would also be possible to use alternatively other connections which are the equivalent of such interphase transformers. That is, the ordinary construction of an interphase transformer having $n$ phases of its main windings which are connected to $n$ neutral points may be employed. Therefore, each phase of the interphase transformer carries the combined current of the $p$ phases which constitute a phase group. But, it would be equally satisfactory if, instead of combining the currents of the $p$ phases in this manner in a single winding, the ampere turns corresponding to the currents could be combined in the interphase transformer in any other way such as by providing in the interphase transformer $p$ closely interlinked coils in series with the respective $p$ anodes, instead of one coil carrying the combined current of the $p$ anodes.

While we have shown and described our invention as applied to particular systems of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In combination, an alternating current circuit, a direct current circuit, electric translating apparatus connected between said circuits and comprising a plurality of electric discharge paths and $n$ groups of electrically displaced phase windings, each group comprising $p$ phases and each having an electrical neutral connection, an interphase transformer connected between the neutral connections of said groups and having auxiliary windings, the turn ratio of said interphase transformer being:

$$\frac{x}{y} = \frac{1}{\left[\dfrac{n \sin \dfrac{(n-1)\pi}{np}}{\sin \dfrac{\pi}{p}} - n + 1\right]} - 1$$

where $x$ represents the number of turns of the auxiliary windings and $y$ represents the number of turns of the main portion of the interphase transformer winding, and auxiliary rectifying devices connected to said auxiliary windings and connected to operate in parallel with said first mentioned electric discharge paths.

2. In combination, an alternating current circuit, a direct current circuit, electric translating apparatus connected between said circuits and comprising a plurality of electric discharge paths and comprising two six-phase double-star inductive networks connected in parallel, a pair of interphase transformers each associated with a different one of said group and each having a pair of opposing main windings and opposing auxiliary windings, the turn ratio of the main windings to the auxiliary windings being:

$$\frac{x}{y} = 5.46$$

where $x$ represents the number of turns of the auxiliary windings and $y$ represents the number of turns of the main windings, and two pairs of auxiliary rectifying devices connected to the auxiliary windings of the two interphase transformers and connected to operate in parallel with said first mentioned electric discharge paths.

3. In combination, an alternating current circuit, a direct current circuit, electric translating apparatus connected between said circuits and comprising a plurality of electric discharge paths and comprising two six-phase double-star inductive networks displaced with respect to each other by sixty electrical degrees, an interphase transformer connected between said networks to cause said networks to operate in parallel to form a twelve-phase system, said interphase transformer having a pair of oppositely disposed main windings and a pair of oppositely disposed auxiliary windings, the ratio of the turns of the auxiliary windings to the main windings being approximately 27.3, and a pair of auxiliary electric discharge paths each connected to a different one of said auxiliary windings to cause said system to operate in effect as a twenty-four phase system.

4. In combination, an alternating current circuit, a direct current circuit, electric translating apparatus connected between said circuits and comprising a plurality of electric discharge paths and comprising two six-phase triple-star inductive networks displaced thirty electrical degrees, an interphase transformer for causing said networks to operate in parallel and comprising two oppositely disposed main windings and two opposite disposed auxiliary windings, the ratio of the turns of the auxiliary windings to the main windings being approximately 27.3, and a pair of auxiliary electric discharge paths each connected to a different one of said auxiliary windings for causing said networks to operate in effect as a twenty-four phase system.

5. In combination, an alternating current circuit, a direct current circuit having positive and negative terminals, electric translating apparatus connected between said circuits and comprising a plurality of electrical discharge paths and four three-phase star inductive networks displaced from each other by substantially thirty electrical degrees and each having a neutral connection, interphase transforming means including four windings each having a terminal connected to the neutral connection of one of said networks and each having a terminal connected to the negative terminal of said direct current circuit, and four auxiliary electric discharge paths each connected between a different one of said windings of said interphase transforming means and the positive terminal of said direct current circuit.

6. In combination, an alternating current circuit, a direct current circuit having positive and negative terminals, electric translating apparatus connected between said circuits and comprising a plurality of electric discharge paths and four three-phase star-connected inductive networks displaced thirty electrical degrees, an interphase transformer comprising four legs each comprising two main winding sections and each comprising two auxiliary winding sections, each of the main winding sections being connected in series relation with another main winding section on a different leg and each of the auxiliary winding sections being connected in series relation with an auxiliary winding section on a different leg, and four auxiliary electric discharge paths connected to the auxiliary winding sections.

7. In combination, an alternating current circuit, a direct current circuit having positive and negative terminals, electric translating apparatus connected between said circuits and comprising a plurality of electric discharge paths and four three-phase star-connected inductive networks displaced thirty electrical degrees, an interphase transformer comprising four legs each comprising two main winding sections and each comprising two auxiliary winding sections, each of the main winding sections being connected in series opposition with another main winding section on a different leg and each of the auxiliary winding sections being connected in series opposition with an auxiliary winding section on a different leg, and four auxiliary electric discharge paths connected to the auxiliary winding sections.

8. In combination, an alternating current circuit, a direct current circuit having positive and negative terminals, electric translating apparatus connected between said circuits and comprising a plurality of electric discharge paths and $n$ multi-phase star-connected inductive networks electrically displaced from each other, an interphase transformer comprising $n$ legs each comprising two main winding sections and each comprising two auxiliary winding sections, each of the main winding sections being connected in series relation with another main winding section and a different leg and each of the auxiliary winding sections being connected in series relation with an auxiliary winding section on a different leg, and $n$ auxiliary electric discharge paths connected to the auxiliary winding sections.

9. In combination, an alternating current circuit, a direct current circuit having positive and negative terminals, electric translating apparatus connected between said circuits and comprising a plurality of electric discharge paths and $n$ multi-phase star-connected inductive networks electrically displaced from each other, an interphase transformer comprising $n$ legs each comprising two main winding sections and each comprising two auxiliary winding sections, each of the main winding sections being connected in series relation with another main winding section and a different leg and each of the auxiliary winding sections being connected in series relation with an auxiliary winding section on a different leg, the ratio between the turns of the auxiliary winding sections to the turns of the main winding sections being as follows:

$$\frac{x}{y} = \frac{1}{\left[\dfrac{n \sin \dfrac{(n-1)\pi}{np}}{\sin \dfrac{\pi}{p}} - n + 1\right]} - 1$$

where $x$ represents the auxiliary winding turns, $y$ represents the main winding turns, $p$ represents the number of phase windings in each network, and $n$ auxiliary electric discharge paths connected to the auxiliary winding sections.

10. In combination, an alternating current circuit, a direct current circuit having positive and negative terminals, electric translating apparatus connected between said circuits and comprising a plurality of electric discharge paths and $n$ multi-phase star-connected inductive networks electrically displaced from each other, each of said networks comprising $p$ zigzag phase windings, an interphase transformer comprising four legs each having two main winding sections and each comprising two auxiliary winding sections, each of said main winding sections being connected in series relation with another main winding section on a different leg and each auxiliary winding section being connected in series relation with an auxiliary winding section on a different leg, the turn ratio of the auxiliary winding sections and the main winding sections being approximately 2.76, and $n$ auxiliary electric discharge paths connected to the auxiliary winding sections.

11. In combination, an alternating current circuit, a direct current circuit having positive and negative terminals, electric translating apparatus connected between said circuits and comprising a plurality of electric discharge paths and a plurality of multi-phase inductive networks, interphase transforming means between predetermined groups of said networks, an interphase transformer connected between said interphase transforming means and one terminal of said direct current circuit, an auxiliary interphase transformer comprising a magnetic core structure having a plurality of legs corresponding in number to the number of said inductive networks, each of said legs comprising a plurality of winding sections corresponding in number to the number of said networks and being connected to balance said auxiliary interphase transformer to prevent saturation of the core structure, and a plurality of auxiliary electric discharge paths connected to said winding sections.

JOHN W. BOAG.
JOHN C. READ.